United States Patent [19]

Ruin

[11] 4,201,355
[45] May 6, 1980

[54] FISHING REELS
[75] Inventor: Jean Ruin, Thyez, France
[73] Assignee: Mitchell S.A., France
[21] Appl. No.: 958,949
[22] Filed: Nov. 8, 1978
[30] Foreign Application Priority Data
Nov. 30, 1977 [FR] France ............................ 77 367881
[51] Int. Cl.² ............................................ A01K 89/00
[52] U.S. Cl. ............................................ 242/84.1 R
[58] Field of Search .................. 242/84.1 R, 84.2 R, 242/84.21 R, 84.21 A, 84.51 A, 84.51 R, 219; 116/115; 74/577 SF

[56] References Cited
U.S. PATENT DOCUMENTS 3,123,319 3/1964 Hull ............................ 242/84.51 A
3,741,493 6/1973 Jones ............................ 242/84.1 R Primary Examiner—Billy S. Taylor
Attorney, Agent, or Firm—Robert E. Burns; Emmanuel J. Lobato; Bruce L. Adams

[57] ABSTRACT

A fishing reel which has a control device for operating an audible warning device. The control device comprises an operating member located externally of the reel and rotatably mounted thereon by means of an extension of the operating member. The operating member co-operates by means of a profiled extension thereof with an elongate resilient member which can co-operate with the audible warning device. The elongate resilient member is supported within the reel by a part of the member fitted freely and parallel to the axis of said extension on a support on the inner side of the wall. The profiled extension of the operating member is integral with the extension to the operating member and has a terminal radial flange which extends over at least a portion of the periphery of the profiled part. The flange is in facing relationship with a first part of the resilient member, which first part is shaped to co-operate with the radial flange. The dimension of the radial flange is such that it passes freely through an aperture in the wall of the reel which houses the extension of the operating member and the distance between the radial flange and the inner side of the wall of the reel is just sufficient to accommodate the first part of the resilient member.

8 Claims, 6 Drawing Figures

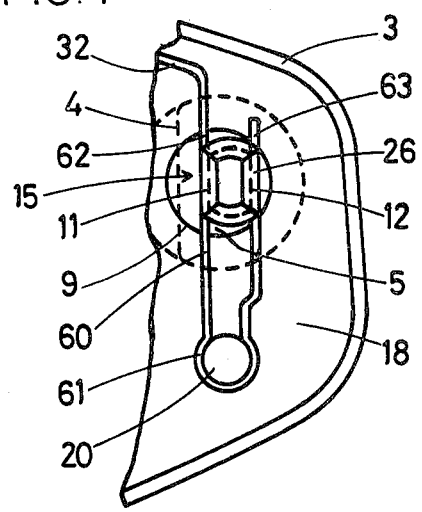
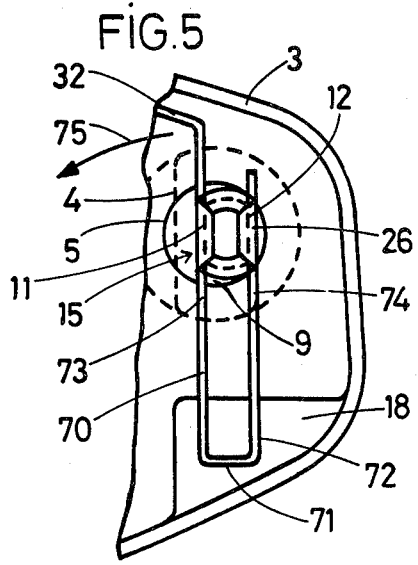
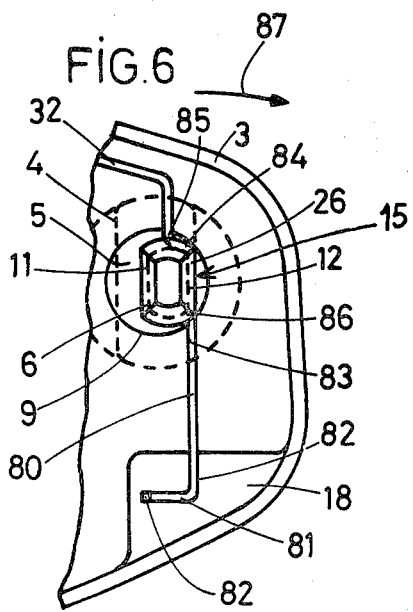

FISHING REELS

The present invention relates to a fishing reel having a control device comprising an operating member provided at an outer side of one wall of the reel and having an extension rotatably mounted in said wall, said operating member being selectively locatable at one of at least two angular positions under the action of an elongate resilient member which can be deformed by bending and which is located on the inner side of said wall, the elongate resilient member being supported on the reel and comprising a first part subject to bending stress and co-operating with a profiled part provided on the extensions of the operating member and a second part also subject to bending stress and intended to co-operate with an audible warning device.

In known control devices of this type, the external dimensions of the profiled part are greater than those of the pivot, i.e. the extension of the control member which is rotatably mounted in the wall of the reel. The profiled part is constituted by a separate profiled member which, after the introduction of the pivot into its bearing, is fixed to the free end of this pivot by a stop ring, so that it is thus prevented from rotating with respect to said pivot. The pivot and the profiled member are thus each located on one side of the wall of the reel, the profiled member serving as an abutment for keeping the operating member and its pivot in place. Furthermore, the elongated resilient member (also referred to hereinafter as the elastically yieldable member), which is constituted by a bent plate spring, is fixed by a screw to a fixed inner part of the reel. A control device of this type is relatively complicated and the mounting of the profiled member on the pivot of the operating member as well as the mounting of the plate spring on the body of the reel take a relatively long time and require special tools. In addition, dismantling of the same parts, for the purpose of repairs or cleaning for example, involves similar drawbacks.

The control device according to the invention makes it possible to obviate these drawbacks. In fact, it is constituted by a mechanism whose structure is relatively simpler than that of the prior art and which is able to be fitted easily and virtually instantaneously on the body of the fishing reel, whilst it can be easily dismantled when necessary.

The control device which is the object of the invention comprises an elongated elastically yieldable member which is supported on the fixed part of the reel, by a part fitted freely and parallel to the axis of the pivot of the operating member, in a part whose profile interacts with that of said fixed part. It also comprises a profiled part extending the pivot, which is in one piece with said pivot and is terminated by a flange extending radially outwards over at least a portion of the periphery of this profiled part, in facing relationship to the first part of the elongated elastically yieldable member. This first part is shaped in order to co-operate with the radial flange. The external dimensions of this flange are provided in order that the latter passes freely through the bearing of the pivot. The distance between the flange and the inner side of the wall of the reel is just sufficient to house the first part of the elongated elastically yieldable member.

According to one embodiment, the part of the reel having an interacting profile is constituted by a shaft co-operating with which is an aperture of corresponding dimensions provided in the elongated elastically yieldable member. The first part of the latter, shaped in order to co-operate with the radial flange, comprises an oblong opening arranged along the longitudinal axis of the elongated elastically yieldable member. The two opposed inner sides of this opening are substantially parallel to each other and with the two corresponding outer sides of the elongated elastically yieldable member, respectively define two elastically deformable arms which co-operate with the radial flange. According to another embodiment, the shaft which constitutes the part of the reel of interacting profile, co-operates with a loop of the elongated elastically yieldable member surrounding at least the major part of the periphery of the shaft. This loop connects two sides whereof one constitutes the second part of the elongated elastically yieldable member. The two sides, which are substantially parallel, respectively constitute two elastically deformable arms which constitute the first part which is shaped in order to co-operate with the radial flange.

According to one embodiment, the part of the reel of interacting profile is constituted by a groove having a cross section substantially of U-shape, co-operating with which is a part bent in the shape of a U, of interacting profile, of the elongated elastically yieldable member. This part bent in the shape of a U connects two sides whereof one constitutes the second part of the elongated elastically yieldable member. The two sides, which are substantially parallel, constitute two elastically deformable arms, which constitute the first part shaped in order to co-operate with the radial flange. According to another embodiment, the part of the reel of interacting profile is constituted by a groove whose cross section is bent and co-operating with which is a bent end, of interacting profile, of the elongated elastically yieldable member, the first part of this elongated elastically yieldable member being constituted by a single arm which is bent in order to surround a portion of the periphery of the profiled part extending the pivot, in order to co-operate with the radial flange.

The drawings illustrate, by way of example, embodiments of the control device according to the present invention.

FIG. 4 shows a second embodiment of the invention, in plan view.

FIG. 5 shows a third embodiment of the invention, in plan view.

FIG. 6 shows a fourth embodiment of the invention, in plan view.

Figure 2:
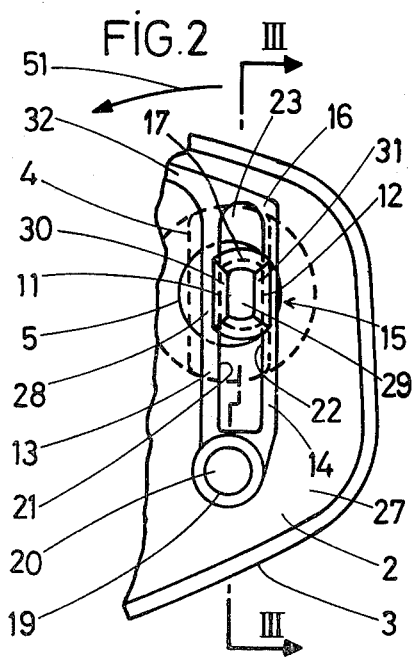
FIG. 2 shows the same embodiment of the control device, illustrated alone, to an enlarged scale.
Figure 3:
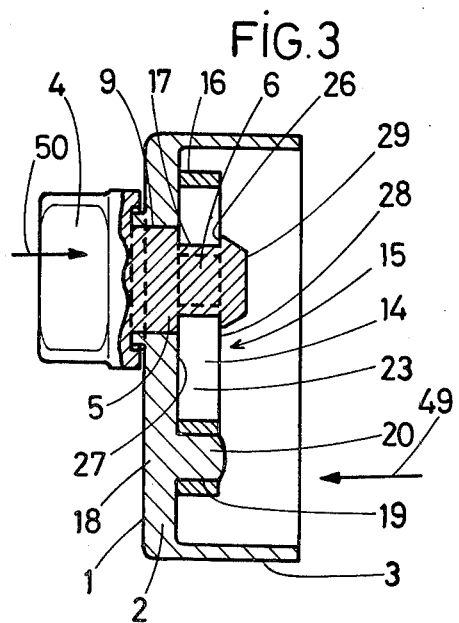
FIG. 3 shows the same first embodiment in a sectional view on line III—III of FIG. 2.

As shown in FIGS. 2 and 3, the control device according to the invention comprises on the outer side 1 of the wall 2 of the body 3 of a fishing reel, an operating knob 4 provided with a cylindrical extension for example, constituting a pivot 5 provided to rotate in an aperture 9 serving as a bearing, arranged transversely with respect to the wall 2. The pivot 5 is extended by a profiled part 6, which is located on the other side of the wall 2. In this case, this profiled part 6 comprises for example two flat parts 11 and 12 which are parallel to each other and in facing relationship. These two flat parts 11 and 12 are eccentric with respect to the pivot axis of the pivot 5 supporting them and their ends are connected by curved parts 17 whose spacing is greater than that of the two flat parts 11 and 12. The latter co-operate respectively with two arms 13 and 14 constituting the first part 15 of an elongated elastically yieldable member 16 which is supported moreover on a fixed part 18 of the body 3, by means of an aperture 19 fitted freely on a shaft 20 integral with the fixed part 18 and arranged parallel to the axis of the pivot 5. The arms 13 and 14 are defined on one side by the two parallel opposed inner sides 21 and 22 of an opening 23 arranged along the longitudinal axis of the elongated elastically yieldable member 16 and on the other side by the two corresponding outer sides of this member 16. The two arms 13 and 14 are elastically deformable and are constantly in contact by their sides 21 and 22 with the two flat parts 11 and 12. The profiled part 6 is terminated by a flange 26 extending radially outwards, over the entire periphery of this profiled part 6, in this example. The outer dimensions of this flange 26 are provided in order that the latter passes freely through the aperture 9. The distance between the flange 26 and the inner side 27 of the wall 2 is just sufficient to house the two arms 13 and 14 of the elongated elastically yieldable member 16. Thus, the flange 26 is located in facing relationship to the side 28 of the two arms 13 and 14 and to the arrangement of the elongated elastically yieldable member 16, which, in this example, has a general flat shape and is arranged parallel to the wall 2.

This member 16 is produced for example by being cut from a metal strip or by moulding plastics material. The radial flange 26 comprises a cap 29 with opposed inclined sides 30 and 31. The operating knob 4, the pivot 5, the profiled part 6, the flange 26 and the cap 29 constitute a member which cannot be dismantled, is advantageously in one piece and is produced by moulding for example.

The elongated elastically yieldable member 16 comprises a second part 32 which, in this example, is a continuation of the first part 15 and which is intended to co-operate by its end 44 with a nonreturn and audible warning device. The latter comprises (FIG. 1) a lever 33 pivoted at 34, whereof a first end 35 co-operates with a cam 36 connected in an angular manner to an operating lever 37 and whereof a second end 38 in the form of a pawl is intended to co-operate with the teeth of a ratchet 39 connected in an angular manner to a toothed pinion 40 able to be set in rotation by a toothed wheel 41 connected to the driving crank of the reel, not shown in the drawing. Friction means, not shown in the drawing, are located between the lever 33 and the toothed wheel 41. A plate spring 45 co-operates with either of two flat parts 46 integral with the operating lever 37.

In order to fit the control device according to the invention on the body 3 of the reel, one proceeds as follows: the elongated elastically yieldable member 16 is firstly fitted by hand freely in the direction of arrow 49 by its aperture 19 on the shaft 20 and the opening 23 is placed substantially opposite the aperture 9, by pivoting the member 16 about this shaft 20. When the member 16 is thus fitted, the flange 26 and the profiled part 6 of the operating knob 4 are introduced by hand in the direction of arrow 50 through the aperture 9, the inclined sides 30 and 31 of the cap 29 momentarily separating the two arms 13 and 14. When the pivot 5 is located in the aperture 9, the two arms 13 and 14 move back resiliently towards each other and once more come into contact with the flat parts 11 and 12 respectively. The assembly is thus completed. The flange 26 co-operates with the side 28 of the elongated elastically yieldable member 16, on the one hand in order to prevent the movement of the operating knob 4 in the direction of arrow 49 and on the other hand, in order to prevent the movement of the elongated elastically yieldable member 16 in the direction of arrow 50. The operating knob 4 and the elongated elastically yieldable member 16 thus occupy a first position shown in FIGS. 1 and 2 for example.

When the operating knob 4 is rotated in either direction, in order to leave this first position, the curved parts 17 momentarily separate the arms 13 and 14, then these arms 13 and 14 come into contact with the flat parts 12 and 11 respectively. At the same time, the arrangement of the elongated elastically yieldable member 16 moves in the direction of arrow 51 (FIG. 2), by pivoting about the shaft 20, in order to occupy a second position not shown in the drawing, like the operating knob 4. During these pivoting movements, the flange 26 continues to co-operate with the side 28 of the elongated elastically yieldable member 16 in order to keep the operating knob 4 and the elongated elastically yieldable member 16 in position.

Figure 1:
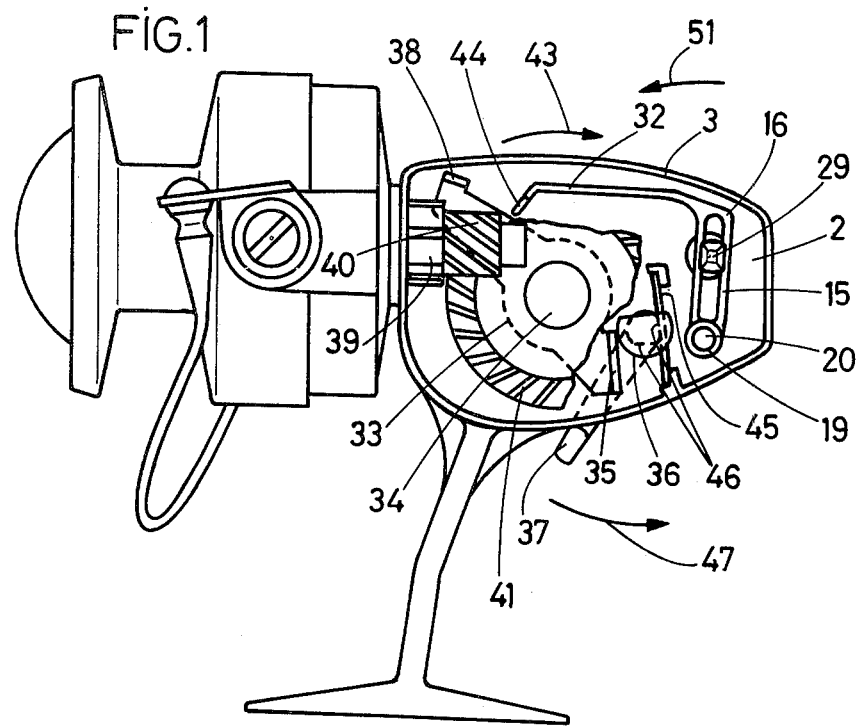
FIG. 1 shows a first embodiment of the invention, in plan view, applied to a non-return and audible warning device.

When the operating lever 37 occupies a first position, namely that of FIG. 1, an upper point of the cam 37 raises the first end 35 of the lever 33, whereof the second end 38 is disengaged from the teeth of the ratchet wheel 39. The non-return device is thus disengaged and whatever the angular position of the operating knob 4, the action of the second part 32 of the elongated elastically yieldable member 16 has no effect on the lever 33 and the audible warning device is not able to operate.

After a movement in the direction of arrow 47, when the operating lever 37 occupies a second position (not shown in the drawing), a lower point of the cam 36 co-operates with the first end 35 of the lever 33. The second end 38 of this lever 33 is thus free to co-operate with the ratchet 39.

Thus, when the toothed wheel 41 is rotated in the direction of arrow 43 (FIG. 1), the friction means tend to entrain the lever 33 in the same direction and the second end 38 of this lever 33 is disengaged from the teeth of the ratchet 39. If the elongated elastically yieldable member 16 occupies its first position, shown in FIGS. 1 and 2, its end 44 is not in contact with the lever 33, in the vicinity of the second end 38 of the latter and the audible warning device does not operate. If the elongated elastically yieldable member 16 occupies its second position, obtained after rotating the operating knob 4 through half a revolution, its end 44 bears elastically on the lever 33 in the vicinity of the second end 38 of the latter. The audible warning device thus operates since, on passing each tooth of the ratchet 39, the end 44 pushes the second end 38 of the lever 33, into the recess following said tooth, against the action of the friction means which are not shown.

When the toothed wheel 41 is rotated in the direction opposed to that of the arrow 43 (FIG. 1), the friction means tend to entrain the lever 33 in the same direction and the second end 38 of this lever 33 meshes with one of the teeth of the ratchet 39, the non-return device thus fulfilling its function. In this case, the elongated elastically yieldable member 16 does not fulfil any function. At the most, if it occupies its second position it tends to keep the second end 38 in mesh with one tooth of the ratchet 39.

Without diverging from the scope of the present invention, the control device according to the invention could actuate solely an audible warning device. It could even form part of said audible warning device, the end 44 co-operating directly with a moving part comprising notches or teeth, over its periphery for example.

To disconnect the operating knob 4 from the elongated elastically yieldable member 6, for example when cleaning the reel, it is sufficient to separate the two arms 13 and 14 with an instrument such as the bit of a screw driver and to simultaneously remove the operating knob 4 in the direction of arrow 49. The elongated elastically yieldable member 16 is consequently also released in the direction of arrow 50.

As illustrated in FIG. 4, the second embodiment of the invention comprises an elongated elastically yieldable member 60 which is supported on the fixed part 18, by a loop 61 surrounding the major part of the periphery of the shaft 20, this loop 61 being fitted freely on the shaft 20 previously described. The loop 61 connects two arms 62 and 63 which are substantially parallel to each other, which are elastically deformable and which constitute the first part 15 of the elongated elastically yieldable member 60. The arms 62 and 63 co-operate with the flat parts 11 and 12 as well as with the flange 26. The elongated elastically yieldable member 60 comprises a second part 32 which is constituted by an extension of the arm 62. This part 32 co-operates for example with the afore-described non-return, audible warning device (FIG. 1). All the other parts are identical to those of the first embodiment described (FIGS. 1 to 3). The operation of the arrangement is identical to that of this first embodiment.

The third embodiment of the control device according to the invention, as illustrated in FIG. 5, comprises an elongated elastically yieldable member 70 which comprises a part 71 bent in the shape of a U, intended to be fitted freely in a groove 72 whose cross section has an interacting profile of U-shape. This groove 72 is provided in the fixed part 18 of the body 3 of the reel, parallel to the axis of the pivot 5. It replaces the shaft 20 of the two aforedescribed embodiments. The part 71 bent in the shape of a U connects two arms 73 and 74 which are substantially parallel to each other during the operation of the control device. These two arms 73 and 74 are elastically deformable and they are both braced in order to remain constantly in contact with the profiled part 6 and to co-operate with the radial flange 26, whatever the angular position of the operating knob 4. They constitute the first part 15 of the elongated elastically yieldable member 70 whose second part 32 is constituted by an extension of the arm 73. All the other parts are identical to those of the first embodiment.

The operation of this third embodiment is similar to that of the first two. Starting from its first position (FIG. 5) when the operating knob 4 is rotated through half a revolution, the arm 73 is deflected in the direction of arrow 75 and actuates the non-return and audible warning device. Since it is braced, the arm 74 remains in contact with the corresponding flat piece. The two arms 73 and 74 thus continue to co-operate with the flange 26.

The fourth embodiment of the control device according to the invention, as illustrated in FIG. 6, comprises an elongated elastically yieldable member 80 which comprises a bent part 81 intended to be fitted freely in a groove 82 whose bent cross section has an interacting profile. This groove 82 is provided in the fixed part 18 of the body 3 of the reel. Its longitudinal axis is parallel to that of the pivot 5. The first part 15 of the elongated elastically yieldable member 80 is constituted by a single arm 83 which is bent at 84 and 85 in this example in order to surround a portion of the periphery of the profiled part 6 extending the pivot. Thus, the radial flange 26 co-operates in particular with the part 85 and with another part 86 of the arm 83, these parts being approximately diametrically opposed with respect to the axis of the pivot 5, which facilitates correct retention of the operating knob 4 in the aperture 9. The arm 83, which is elastically deformable, is braced in order to remain constantly in contact with the profiled part 6 and to co-operate constantly with the radial flange 26, whatever the angular position of the operating knob 4. The second part 32 of the elongated elastically yieldable member 80 is constituted by an extension of the single arm 83. All the other parts are identical to those of the third embodiment.

The operation of the arrangement is similar to that of this third embodiment. In order to fit the control device, after having fitted the bent part 81 freely in the groove 82, it is sufficient to bend the arm 83 in the direction of arrow 87, to introduce the pivot 5 into its aperture 9 and to release the arm 83 which fits below the radial flange 26.

The elongated elastically yieldable members respectively 60, 70, 80 of the second, third and fourth embodiments afore-described, are advantageously constituted by a metal strip of flat or circular section, having a suitable shape. They could also be constituted for example by members made from moulded plastics material.

The control device which is the object of the invention can be used in fishing reels, where it is necessary for a device of this type to be able to be assembled and dismantled easily and quickly, whilst having a very simple structure.

What is claimed is:

1. A fishing reel comprising a housing having a wall with a circular opening therein, an audible warning device in said housing,
    an operating member having a pivot portion rotatably received in said opening, an operating portion outside said wall and a profiled portion inside said housing with a peripheral flange inwardly of said profiled portion, said profiled portion and flange being of a size to pass through said opening, and
    a resilient member removably mounted on the inner side of said wall for angular movement about a pivot axis spaced from said opening, said resilient member having a first portion resiliently engaging said profiled portion of said operating member for angular movement of said resilient member upon rotation of said operating member and cooperating with said peripheral flange to retain said operating member in said opening and to retain said resilient member on the inner side of said wall, and a second portion cooperating with said audible warning device.

2. A fishing reel according to claim 1, in which said resilient member is mounted on the inner side of said wall by a shaft projecting inwardly on the inner side of said wall with a pivot portion of said resilient member rotatably received on said shaft.

3. A fishing reel according to claim 2, in which said first portion of said resilient member comprises two resiliently deformable arms which define between them an elongate opening which receives said profiled portion of said operating member.

4. A fishing reel according to claim 3, in which said pivot portion of said resilient member comprises a loop which surrounds at least a major part of the periphery of said shaft and connects said two resiliently deformable arms of said resilient member.

5. A fishing reel according to claim 1, in which said wall has on its inner side a groove spaced from said opening, and in which said resilient member is mounted on the inner side of said wall by an anchoring part of said resilient member received in said groove and retained therein by engagement of said peripheral flange of operating member with said first portion of said resilient member.

6. A fishing reel according to claim 5, in which said groove and the part of said resilient member received therein are substantially U-shaped and in which said first portion of said resilient member comprises two resiliently deformable arms which are connected by said U-shaped part and which receive said profiled portion of said operating member between them.

7. A fishing reel according to claim 5, in which said first portion of said resilient member comprises a single resiliently deformable arm which is bent in order to surround a portion of the periphery of said profiled portion of said operating member and to engage said peripheral flange to retain said operating member in said opening and to retain said anchoring part of said resilient member in said groove.

8. A fishing reel according to claim 1, in which said peripheral flange of said operating member comprises a substantially conical cap portion having inclined sides which cooperate with said first portion of said resilient member to displace it and allow said flange to pass by said first portion of said resilient member when said operating member is inserted in said opening.

* * * * *